INVENTOR
MICHAEL S. SHEBANOW
BY Fred Jacob
ATTORNEY

INVENTOR
MICHAEL S. SHEBANOW
BY Fred Jacob
ATTORNEY

INVENTOR
MICHAEL S. SHEBANOW
BY Fred Jacob
ATTORNEY

INVENTOR
MICHAEL S. SHEBANOW
BY Fred Jacob
ATTORNEY

United States Patent Office 3,465,319
Patented Sept. 2, 1969

3,465,319
STORAGE DEVICE WITH ADHERENCE OF RECORD MEMBER TO ROTATING DRUM DURING INFORMATION TRANSFER

Michael S. Shebanow, Medfield, Mass., assignor to Honeywell Inc., Minneapolis, Minn., a corporation of Delaware Filed June 21, 1965, Ser. No. 465,638
Int. Cl. G11b 5/76
U.S. Cl. 340—174.1 15 Claims

ABSTRACT OF THE DISCLOSURE

Records, preferably flexible, are stored in cartridges which are located within the periphery of a hollow cylindrical rotating drum. A randomly selected record is moved from the cartridge into contact with the drum. The record is then held on the internal surface of the rotating drum and passed by a transducer. After completion of the information transfer operation, the card is returned to the storage cartridge.

The present invention relates in general to new and improved data processing apparatus, in particular to unit record processing apparatus wherein the unit records are randomly accessible for data transfer operations.

While it is not so limited, the invention is applicable and will be explained with reference to apparatus wherein the unit records take the form of flexible cards or tape strips. In one practical embodiment of the invention, the cards have at least one surface of magnetic material on which data may be stored in the form of discrete magnetized spots. In random access memory equipment of this kind, it is important that the individual cards be selected rapidly from a deck or stack of cards when called for. Once selected, the desired data transfer operation is carried out and the card is returned to the deck. The data transfer and card return operations must similarly be carried out with a minimum of delay in order to ready the card for a subsequent selection.

The data transfer operation is normally carried out by moving the magnetized card surface past a transducer, in the case under consideration, past a magnetic head. In prior art equipment of the type under discussion, the card is commonly held on the external perforated surface of a pneumatic capstan during the data transfer operation. The application of vacuum pressure to the capstan interior causes the card to be retained in flexibly conforming contact with the capstan surface. External apparatus of this type thus requires vacuum pump equipment of relatively large capacity which materially increases the overall equipment cost. Where the circumference of the capstan does not materially exceed the total length of the card, relatively little vacuum pressure is required to retain the card in place on the rotating capstan in opposition to the resilient force tending to straighten out the card against the action of the centrifugal force. The applied vacuum pressure required increases where only a portion of the external capstan surface is covered by the record card and the remainder of the capstan surface is open to atmosphere. Clearly this limits the size of the capstan for a given card and, as a consequence, only capstans of a size sufficient to carry one card at a time have been found economical in the past.

At its maximum, the applied vacuum pressure must be adequate to retain the leading portion of the card in place when the card first reaches the rotating capstan upon being selected, i.e. when the remanider of the peripheral capstan surface is open to atmosphere. As previously explained, the force of the applied vacuum pressure must counter the natural resilience of the card tending to straighten out the latter, in addition to the opposing action of the centrifugal force which may be considerable at the required capstan speeds. The limit on the size of the capstan, which is governed by the capacity of the vacuum pump, makes necessary the use of a second pneumatic capstan and associated inter-capstan raceways in order to return a card to its stack. In such equipment, the surface velocity of the return capstan, which rotates at a lower rate, must be carefully controlled relative to the surface velocity of the data transfer capstan so that the decrease in momentum of the card will not cause the latter to slip off the return capstan.

In an attempt to avoid the foregoing problems and the expense attendant in their solution, it has been proposed to utilize centrifugal force action during the data transfer operation by placing the card against the inside surface of a rotating hollow drum in a manner to expose the magnetized card surface to a magnetic head which is similarly positioned inside the drum. The size of such a drum may be such as to eliminate the requirement for a return drum and associated raceways therebetween. In order to utilize a card transport of this kind without foregoing the advantage of overall card processing speed, or the advantages of simplicity and low equipment cost, special card selection and card return techniques are required. In the absence of such techniques and equipment implementing the same, the time required for card selection and card return in prior art apparatus using such a drum consumes an unduly large portion of the card processing cycle. The equipment for implementing these special selection and return operations are frequently complex and hence expensive and difficult to maintain in proper operating condition.

Accordingly, it is the primary object of the present invention to provide random access unit record processing apparatus of the kind described which is not subject to the foregoing disadvantages.

In prior art apparatus wherein the card is carried on the internal surface of a rotating hollow drum during the data transfer operation, the card selection and/or the card return operation require that the drum be stopped. Either the drum motor must be de-energized and braked in order to carry out this objective, or the drum, which itself may have relatively large inertia, must be declutched from its motor and must then be braked separately. In some prior art equipment, it is necessary to rotate the drum during the card return operation in a direction which is opposite to that when the data transfer operation occurs. The added cost of the equipment to carry out these operations is material. Of even greater importance is the increased length of the card processing cycle. Where, as is frequently the case, only a single track is read out, or recorded on, in a succession of cards, the successive halting of the drum rotation and/or the reversal of rotation, materially lengthen the overall processing time of the cards.

It is another object of the present invention to provide random access card processing apparatus wherein a constantly rotating drum is employed to hold the cards on the internal drum surface during processing.

In order to carry out the card selection and card return operations, prior art card random access apparatus, using a hollow drum, additionally requires the application of vacuum pressure in order to retain the card on the drum while the latter is stopped or is rotating slowly. Any cost advantage inherent in the use of a hollow drum, as compared to card random access equipment wherein the card is held on the external peripheral surface of a capstan, as well as any advantage of equipment simplicity, is thus largely vitiated.

It is a further object of the present invention to provide random access card processing apparatus wherein the card may be held on the internal cylindrical surface of a hollow drum solely by centrifugal force action.

In prior art card random access apparatus using a hollow drum, each card may be individually spooled in a cartridge, successive cartridges being axially positioned relative to the hollow drum to bring them into card processing position where the card is unspooled. Such card spooling produces frictional contact with the magnetized card surface. The resultant wear is responsible for the loss of recorded data and thus decreases long term data transfer reliability. Moreover, the card processing time is increased. In addition to the cartridge axial positioning mechanism, a source of rotational power must be provided for the cartridge itself, thus again increasing the cost and complexity of the equipment.

It is still a further object of the present invention to provide reliable random access card processing apparatus equipment using a hollow drum wherein the card selection and card return operations occur rapidly and require no physical contact with the magnetized card surface and wherein the equipment employed for returning a card is simple in construction and low in cost.

These and other novel features of the invention, together with further objects and advantages thereof, will become apparent from the following detailed specification with reference to the accompanying drawings in which.

Figure 1:
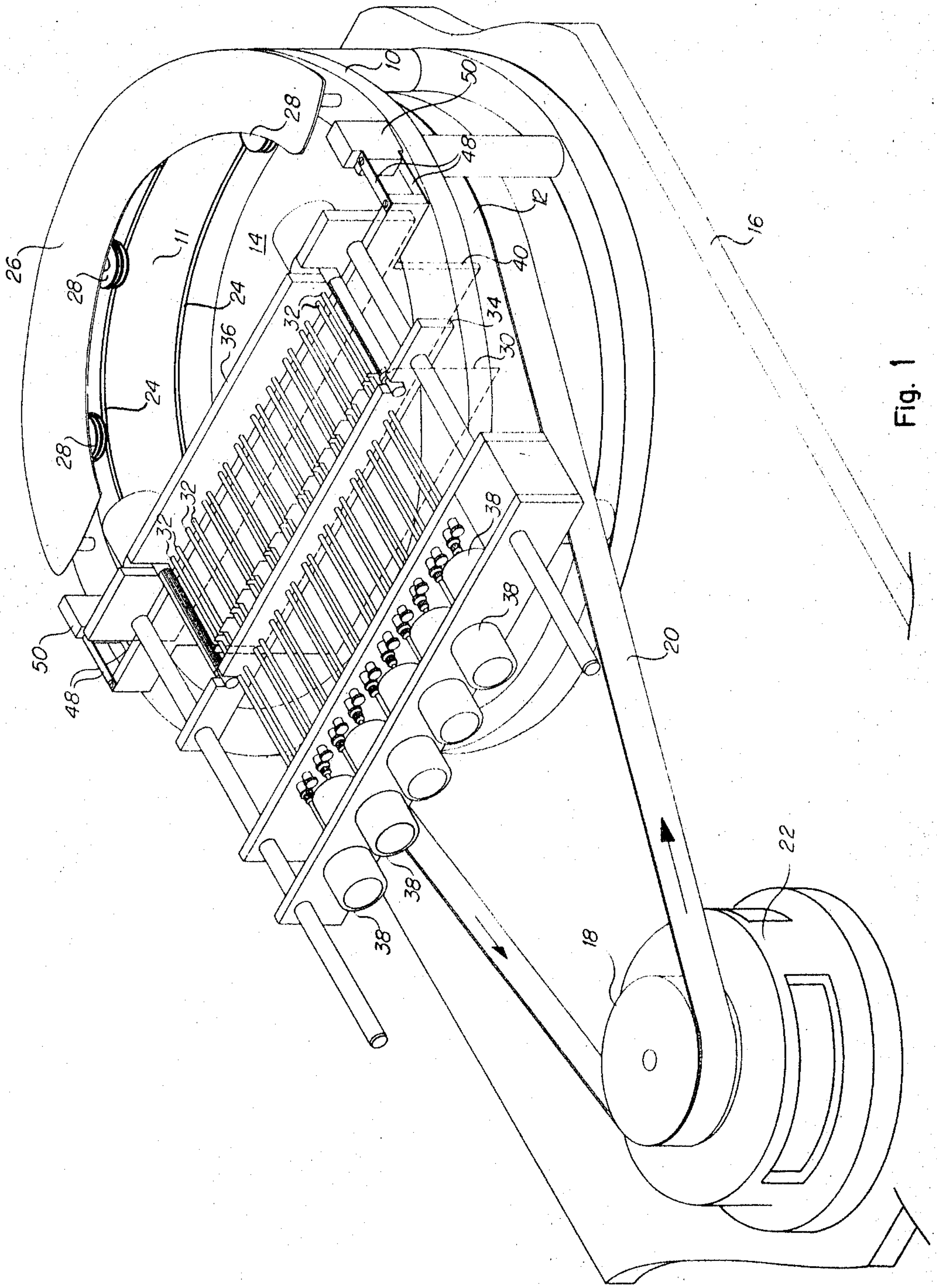
FIGURE 1 illustrates in simplified form a preferred embodiment of the present invention.

With reference now to the drawings, a drum housing 10 is seen to surround a drum 12 which is rotatably supported within the housing. The drum is positioned immediately above a horizontal reference surface 14 of a stationary supporting table 16, the drum axis being normal to the reference surface. The drum is driven from a pulley 18 which is coupled to the drum by means of a belt 20 that extends through the drum housing 10. The pulley 18 is powered by a motor 22.

The drum 12 is open at the top and at the bottom and has an internal cylindrical surface 11 which contains a pair of circumferential grooves 24. As shown in FIGURE 1, a supporting rail 26 circumferentially extends above a portion of the drum and is supported on the drum housing 10 in spaced relationship to the drum. A number of pinch rollers 28 are rotatably supported from the underside of the rail 26 so as to contact the interior drum surface.

For the sake of clarity, only a single record card 30 is illustrated in FIGURE 1 between a pair of rod supports 34 and 36, although it will be understood that a stack containing many cards may be normally positioned between these supports. The card stack may take the form of a cartridge which may be interchanged as required. The top edge of each card is uniquely notched in accordance with the binary digital selection code of the card. This is schematically illustrated in the drawings. Successive pairs of selection rods 32 engage the aforesaid card notches. The selection rods 32 extend through the rod supports 34 and 36 and are adapted to be rotated by corresponding motors 38. The cross section of the selection rods and the configuration of the card notches cooperate to suspend each card 30 from the rods by a predetermined number of notches when the rods are in a first predetermined position. The bottom edge of each suspended card is parallel to the reference surface 14 and is spaced therefrom. If the selection rods which engage these notches are rotated about their axes to a second predetermined position, in accordance with a card selection code signal applied to the appropriate motors 38, the selected card 30 is released and is permitted to fall onto the reference surface 14.

A lift plate 40 is positioned forward of the support 36 so as to face the cards 30, as best shown in FIGURE 4. The lift plate may include first and second rows of holes 42 and 44 respectively, as well as a pair of slots 46 located at both ends of the plate 40. The lift plate is suspended at both ends from a pair of flexures 48. As best seen in FIGURE 1, the flexures 48 are cantilevered from a pair of spring supports 50, which are themselves mounted on the housing structure 10 surrounding the drum.

Figures 2, 5:
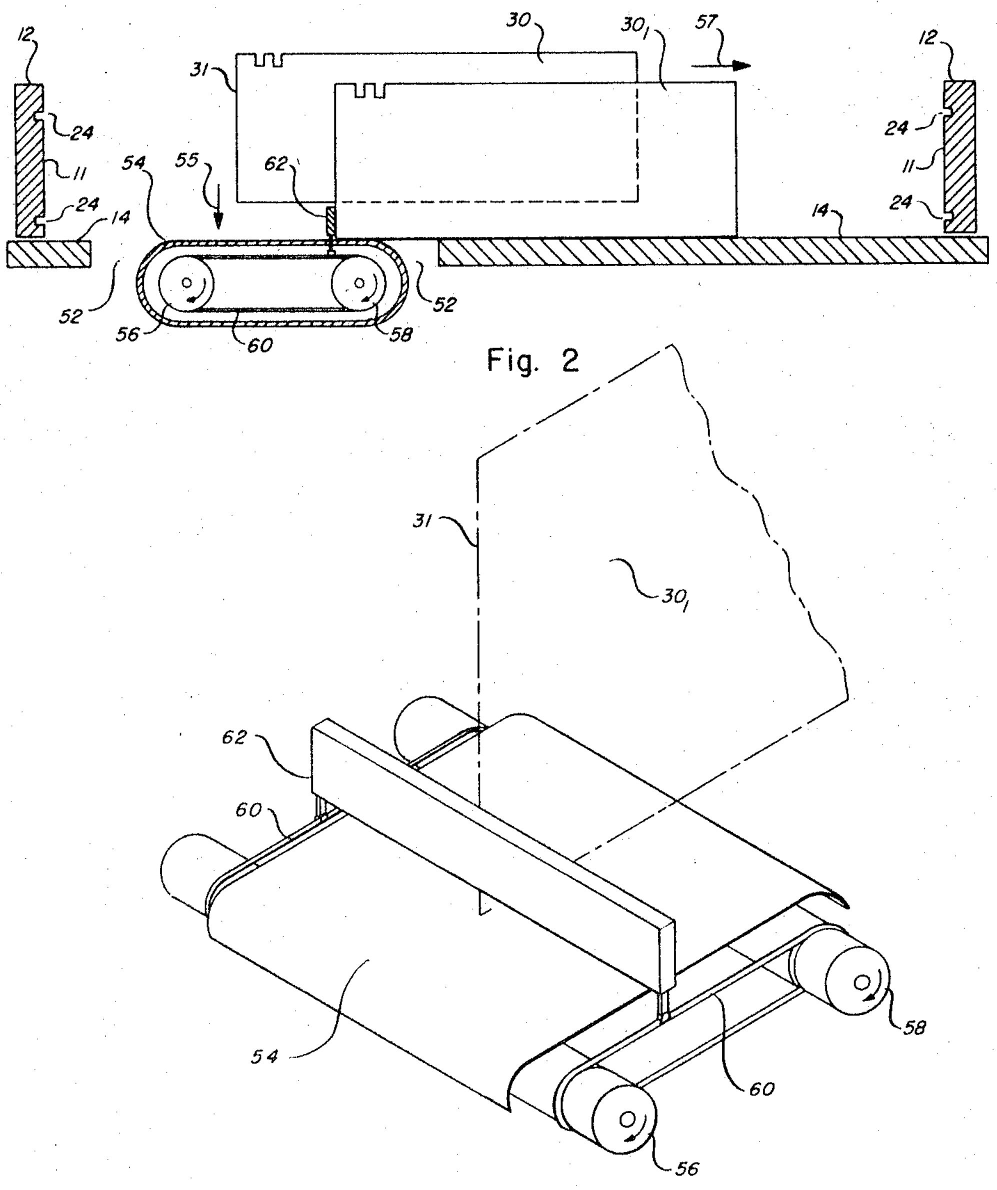
FIGURE 2 is an elevation view of pertinent portions of the apparatus of FIGURE 1 to illustrate one aspect of the overall operation.
FIGURE 5 illustrates in greater detail a portion of the apparatus of FIGURE 2.
Figure 3:
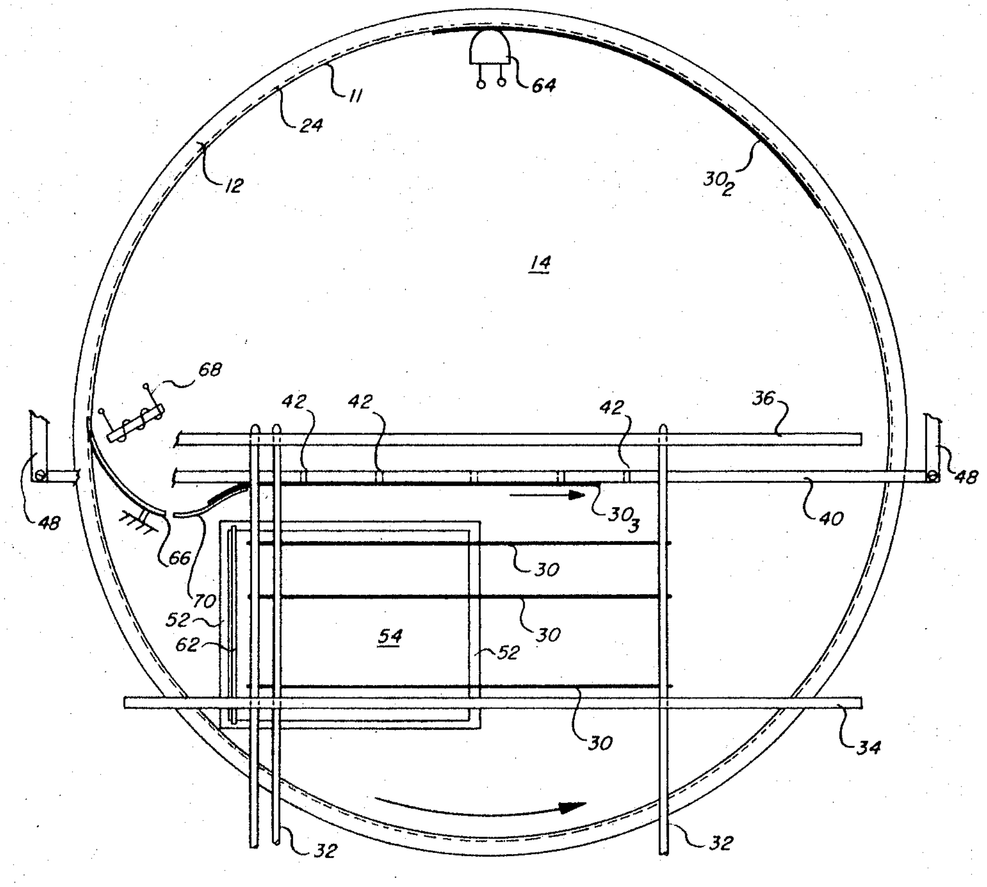
FIGURE 3 is a simplified plan view of the apparatus of FIGURE 1.

As best shown in FIGURES 2, 3 and 5, the reference surface 14 contains a rectangular cutout 52 in which a guide surface 54 is positioned. The horizontal portion of the guide surface 54 is seen to be coplanar with the reference surface 14. A pair of rollers 56 and 58 is positioned below the surface 54 and is engaged by a pair of belts 60. A pusher bar 62 is affixed to both belts, its length extending beyond the width of the surface 54. As rotary power is applied to one of the rollers 56 and 58, in the direction of the arrows shown, the pusher bar is adapted to traverse the length of the surface 54 immediately above the latter. The dimensions of the pusher bar are such as to permit it to descend through the opening 52 at the end of its horizontal path. Thereafter, it is adapted to traverse the length of the surface 54 in the opposite direction below the level of the rollers, until it rises again through the opening 52 and comes to rest in a precisely determined position.

The plan view of FIGURE 3 schematically illustrates a transducer in the form of a magnetic head 64, positioned adjacent the cylindrical surface 11 of the drum 12. In a preferred embodiment of the invention, the head 64 spans a plurality of data tracks on the card which moves underneath the head. FIGURE 3 further illustrates finger means 66 for selectively stripping record cards off the surface 11. The finger means preferably consist of a pair of cantilevered curved flexures, fixed at one end and normally engaging the grooves 24 on the interior drum surface 11. A solenoid 68 is positioned immediately adjacent the fingers 66 and is capable, upon being energized, to lift them out of the grooves 24. A guide 70 forms a natural continuation of the surface defined by the fingers 66 for positioning the stripped-off card, as described in greater detail hereinbelow.

In operation, the drum rotates in the direction of the arrow shown in FIGURE 3. As will be apparent from a consideration of FIGURES 1 and 2, the suspended cards 30 extend inside the drum 12 in a manner where they overlap both the reference surface 14 and the planar portion of the surface 54. The bottom card edge is spaced a short distance from the plane of the surfaces 14 and 54 so that, when a card is selected, the free fall time interval in the direction of the arrow 55 is relatively small. Since the free fall interval constitutes by far the major portion of the processing cycle for a single record card, i.e. from card selection to card return to the point of origin, it is important to keep this interval as brief as possible.

As the selected card drops, it straddles the surfaces 14 and 54. The dropped card is prevented from tipping over by the support it receives from the non-selected cards which are suspended immediately adjacent both sides thereof. The edge 31 of the dropped card is directly in front of the pusher bar 62 when the latter is in its rest position. Rotary power is cyclically applied to one of the rollers 56 and 58. The bar 62 thus accelerates the selected card in the direction of the arrow 57. The action is shown in FIGURES 2 and 5, as applied to the card labeled $30_1$. The pusher bar accelerates the card to the limit of its own path before descending through the opening 52. The card reaches the interior cylindrical drum surface 11 under its own momentum. In the preferred embodiment of the invention that is shown, no special guide surface is required to cause the accelerated card to impinge upon the rotating surface 11 at the proper angle. The latter must be such that the rotational motion of the drum surface is imparted to the card upon impact. Due to the rapid rotation of the drum, the card adheres to the surface 11 by centrifugal force action only. A card that is held in this manner is labeled $30_2$ in FIGURE 3.

As the card is carried by the interior drum surface 11, card skewing is effectively prevented by the action of the conical pinch rollers 28 which serve to return to the reference surface 14 any card tending to ride upwardly. When the card moves past the magnetic head 64 the desired data transfer occurs, either by recording data on the card or by reading data out therefrom. In a preferred embodiment of the invention, the data transfer is carried out in a single track for each pass of the card past the head, the magnetic head being selectively movable in a direction parallel to the axis in order to reach different tracks on the magnetic card surface. As long as additional passes of the card $30_2$ in FIGURE 3 around the drum are required, the solenoid 68 is maintained in its energized state. This action attracts the fingers 66 and keeps them out of the grooves 24.

Figure 4A:
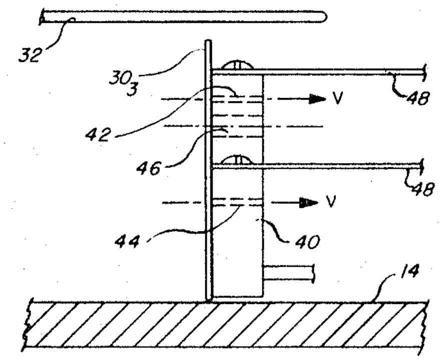
FIGURE 4 is an elevation view of pertinent portions of the apparatus of FIGURE 1 to illustrate another aspect of the operation.
Figure 4B:
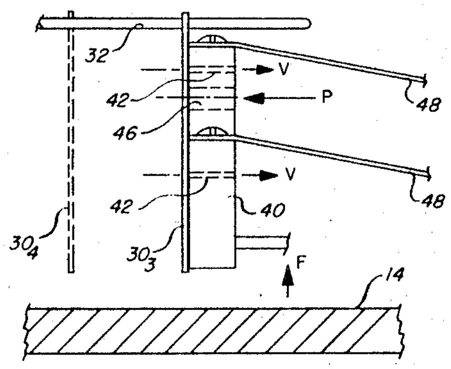

When it is desired to return the moving card to the stack of cards suspended from the rods 32, the solenoid 68 is de-energized and the fingers 66 engage the grooves 24 in the cylindrical surface 11. The approaching card is stripped off the surface 11, its own momentum carrying it past the curved fingers 66 and the contoured guide 70, into contact with the lift plate 40. This action is illustrated in FIGURE 3 relative to a card labeled $30_3$. The moving card $30_3$ is arrested at a precisely predetermined position of the lift plate. FIGURE 4A illustrates the application of vacuum pressure V to the holes 42 in the lift plate. The force exerted by the applied vacuum pressure serves to retain the card in contact with the plate. The card is now positioned below the rods, with the card notches in line with the latter. An upward force is applied to the lift plate 40, such movement being permitted by the action of the flexure spring 48. This upward movement of the plate carries the adhering card $30_3$ with it, as shown in FIGURE 4B. The action must be precisely controlled to cause each notch in the top edge of the card $30_3$ to engage its corresponding selection rod 32. All the rods 32 are relieved in diameter in the area engaged, in order to accept the card notches. A force P, e.g. air pressure, is then applied to the rear surface of the card $30_3$, through the holes 46 in the lift plate 40. Alternatively, a mechanical pushing action may be employed. This force causes the card to be blown or pushed further onto the rods to the position shown in broken lines by the card $30_4$ in FIGURE 4B. The card is thus returned to the stack and is again ready for selection by the rods.

Figure 6:
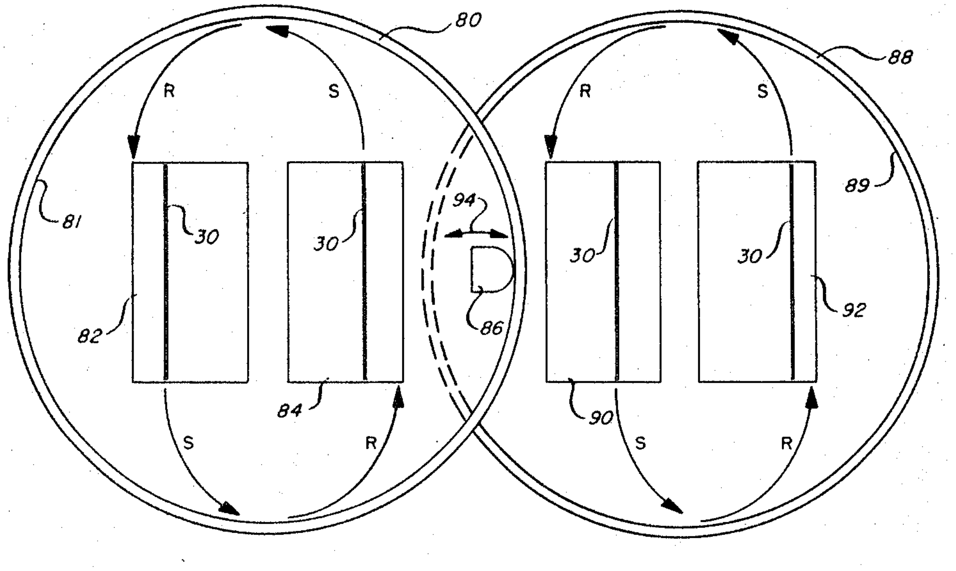
FIGURE 6 illustrates in simplified plan view another embodiment of the present invention.
Figure 7:
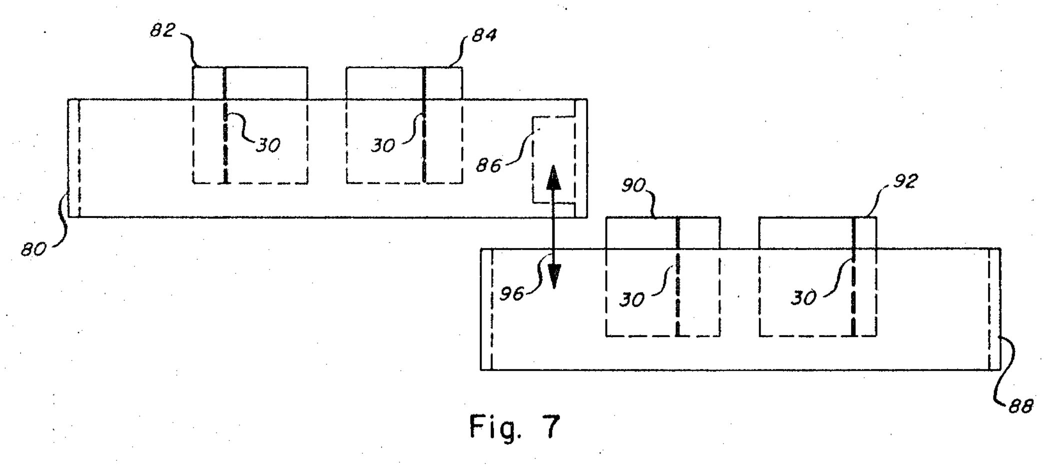
FIGURE 7 is an elevation view of the apparatus of FIGURE 6.

FIGURES 6 and 7 illustrate in plan view and in elevation view respectively, another embodiment of the present invention which is directed to a system of expanded capacity. A pair of card stacks 82 and 84 respectively is seen to be positioned inside a hollow drum 80. Each stack preferably has a separate set of selection rods a hollow drum 80. Each stack preferably has a separate set of selection rods associated therewith in similar manner to the arrangement illustrated in FIGURES 1 and 3. For the sake of clarity the rods have been omitted in FIGURE 6 and only a single card 30 is illustrated for each stack. A card may be selected from either stack and is thereafter accelerated toward the interior surface 81 of the drum, in the direction of the arrow designated by the letter S in the drawing. After the data transfer has been effected by a magnetic head 86, card return for each stack occurs along the path of the arrow designated by the letter R. The equipment for carrying out these operations may be similar to that shown in FIGURES 1 and 5 and has been omitted in FIGURE 6 for the sake of clarity.

The arrangement of two cards stacks within the drum 80 affords the opportunity of selectively shuffling the cards among the two stacks. Thus, a card selected from the stack 82 will be carried past the magnetic head 86 where the data transfer takes place in the manner outlined hereinabove. The card may rotate past the head 86 as many times as is required to effect the data transfer relative to all of the tracks on the card. When the card is to be returned to the stack, such return may be effected by way of either one of the arrows designated by the letter R, i.e. the card may be returned to either one of the stacks 82 and 84. In this manner a sorting operation may be carried out and such sorting may depend on the data read out from the card.

As previously explained, each of the stacks 82 and 84 has its own set of selection rods. By the proper operation of these rods card selection may be staggered in time. Alternatively, card selection may be carried out simultaneously in both of the stacks. In either case, a faster average card processing cycle results, inasmuch as there is no need to await the return of a card before the next selection step is effected.

FIGURES 6 and 7 further show a hollow drum 88 positioned partially below the hollow drum 80. The drum 88 similarly has a pair of card stacks 90 and 92 positioned internally thereof, a single card 30 being illustrated for each stack for the sake of simplicity. Each of the stacks 90 and 92 preferably has its own set of selection rods, omitted for the sake of clarity, in similar manner to the stacks 82 and 84. Upon selection of a card 30 from one of the stacks 90 and 92 respectively, the card is accelerated along the direction of the appropriate arrow S, in the same manner as outlined above. Similarly, each card may be returned to a selected one of the stacks by way of one of the paths labeled R, thereby permitting the cards to be shuffled between the two stacks 90 and 92.

The embodiment of the invention which is illustrated in FIGURES 6 and 7 permits the sharing of the magnetic head 86 between the two drums, by moving it in the direction of the arrow 94 to position it either inside the drum 80, as shown, or inside the drum 88. Thus, a better utilization of an associated computer results, since the cards stacks in one drum may be exchanged without interrupting the readout or recording of information in the other drum. Alteratively, a larger file of cards is available for a given operation, with the head 86 being selectively positioned to transfer data to or from the cards located within the appropriate drum. In the arrangement shown, the head 86 must have an additional degree of freedom in the direction of the arrow 94. This enables the head to turn about an axis parallel to the drum axes so as to face either the interior drum surface 81, as shown in the drawings, or the interior surface 89 of the drum 88 when the head is positioned inside the drum 88. With the apparatus shown in FIGURES 6 and 7, a savings is effected not only with respect to the head itself, but also with respect to the head circuitry which is similarly shared.

From the foregoing discussion it will be apparent that the present invention provides an improved card random access memory system in which cards may be processed at speeds heretofore unattainable and without damage to the mangetized card surface. The invention takes advantage of centrifugal force action to retain the card in contact with the interior surface of a constantly rotating drum. Thus, the use of pneumatic capstans is not required with the result that the equipment is far simpler in construction, more reliable in operation and more economical than heretofore available apparatus of this type.

In the absence of a requirement for a pneumatic capstan, the size of the drum may be increased without any significant increase in cost. The larger drum surface makes possible the use of a single drum for the entire card processing cycle in place of the two capstans formerly required, whose relative angular speed had to be carefully regulated. The size of the drum in the present invention, moreover, permits a number of cards to be simultaneously carried on the interior surface. While this is theoretically possible with a pneumatic capstan where the card is carried on the external capstan surface, the practical implementation of such a system requires a vacuum pump of such size as to make the apparatus uneconomical. Since the centrifugal force aids the action of holding the card on the internal drum surface in the present invention, no special precautions are required to assure the arrival of the card at the drum surface velocity. Hence, the linear velocity imparted to the card by the pusher bar 62 need not be critically controlled.

The present invention is not limited to the embodiment illustrated in the drawings. For example, the geometry and the positioning of the disclosed apparatus may be varied to attain different modifications thereof. The card selection mechanism may be varied in any desired manner, provided only that the selected cards move into contact with the reference surface 14. The belts 60 may carry more than one pusher bar 62 so that only a fraction of a revolution ned be completed for each card processing cycle. The number of stacks in each drum may be chosen in accordance with the desired capacity of the system, its ability to sort cards and the desired decrease in the time required for the average card processing cycle. Similarly, the plural use of drums permits a single head to be employed for more than two drums. It will be understood that the latter arrangement is independent of the number of cartridges used in each drum. Where more than one drum is used, they may be positioned to overlap partially, as shown in FIGURES 6 and 7, or they may be entirely superposed. In the latter case, the degree of head freedom indicated by the arrow 94 may be dispensed with.

From the foregoing disclosure of the present invention, it will be apparent that numerous modifications, changes and equivalents will now occur to those skilled in the art, all of which fall within the true spirit and scope contemplated by the invention.

What is claimed is:

1. Data processing apparatus for use with unit records in the form of flexible record cards, comprising record transport means including a hollow drum open at both ends and further having a substantially cylindrical interior surface, said drum being rotatably positioned about its own axis normal to a substantially horizontal reference surface immediately below said drum, means for constantly rotating said drum about its axis, means for holding a plurality of record cards at rest in a stack above said reference surface with the plane of each card substantially normal thereto, means for selecting a card at random from said stack to bring it into edge-wise contact with said reference surface, means for accelerating said selected card toward said rotating interior drum surface to cause it to adhere thereto, transducer means adapted to be stationed in close proximity to said rotating interior drum surface, means for transferring data between said transducer means and said card adhering to said rotating surface, and means for selectively stripping said card from said rotating surface and returning it to said stack.

2. The appartus of claim 1 wherein said cards are substantially rectangular in area, the axial length of said interior drum surface corresponding approximately to the minor card dimension, said holding means positioning said cards with said minor card dimension extending at least partially inside said hollow drum.

3. The apparatus of claim 1 wherein said cards are substantially rectangular in area, the circumferential dimension of said interior drum surface being capable of accommodating a plurality of record cards in successive lengthwise relationship.

4. Unit record data processing apparatus comprising, rotatable means having a substantially cylindrical interior surface, means for constantly rotating said surface about its own axis, transducer means adapted to be stationed in close proximity to said surface, means for moving a unit record from a point of origin where said unit record is at rest into contact with said rotating surface to cause it to adhere thereto solely by centrifugal force action, means for transferring data between said transducer means and said record moving with said surface, and means for removing said record from said rotating surface and returning it to said point of origin.

5. Data processing apparatus for use with unit records in the form of record cards, comprising a rotatable drum having a substantially cylindrical interior surface, means for constantly rotating said drum about its own axis, means for holding a plurality of said record cards at rest, means for selecting a card at random from said holding means and accelerating it toward said rotating interior drum surface to cause it to adhere thereto, transducer means adapted to be stationed in closed proximity to said rotating interior drum surface, means for transferring data between said transducer means and said card adhering to said rotating surface, and means employing the momentum imparted to said card for stripping the latter from said rotating interior drum surface and returning it to said holding means.

6. The apparatus of claim 5 wherein each of said record cards has a magnetic surface adapted to have data recorded thereon in a plurality of channels, said transducer means comprising a multi-core magnetic head, and means for moving said head transverse to said channels in order to position said cores opposite selected ones of said channels.

7. Unit record data processing apparatus comprising, a stationary, planar reference surface, a hollow drum open at both ends and having a substantially cylindrical interior surface, said drum being rotatably supported adjacent said reference surface with its axis at right angles thereto, means for constantly rotating said drum about said axis, means for holding a plurality of unit records at rest adjacent each other and spaced from said reference surface, said records extending at least partially inside said hollow drum, means for selecting a record at random, means for moving said selected record along said reference surface into contact with said interior surface of said rotating drum to cause it to adhere thereto by the action of centrifugal force, transducer means stationed inside said hollow drum in close proximity to said interior surface, means for transferring data between said transducer means and said selected record moving with said interior drum surface, and means for removing said record from said interior drum surface and returning it to said holding means to a position having the original spacing from said reference surface.

8. A record card data transfer device comprising a stationary substantially horizontal reference surface, a hollow drum rotatably positioned adjacent said reference surface with its axis normal thereto, said drum having a substantially cylindrical interior surface including a plurality of circumferential grooves, means for constantly rotating said drum about said axis, a plurality of record cards positioned in a stack with their planes at right angles to said reference surface, said records extending at least partially inside said drum, means for accelerating a card selected from said stack along said reference surface into contact with the rotating interior drum surface to cause said card to adhere thereto by centrifugal force action, transducer means adapted to be stationed interiorly of said drum in close proximity to said cylindrical surface, means for transferring data between said transducer means and said record card moving with said interior drum surface, finger means selectively adapted to engage said grooves to strip said record card off said interior drum surface, and means for returning said record card to said stack.

9. The apparatus of claim 8 wherein each of said record has a magnetic surface, said tranducer means comprising a magnetic head selectivly adapted to transfer data relative to said record cards.

10. The apparatus of claim 8 wherein said record cards are substantially rectangular in area, the major dimension edges of said stacked record cards being substantially parallel to said reference surface, the axial dimension of said interior drum surface corresponding substantially to the minor dimension of said record cards, the circumferential dimension of said interior drum surface being capable of accommodating a plurality of record cards in successive lengthwise relationship.

11. The apparatus of claim 10 and further comprising a housing surrounding said drum, a supporting rail positioned on said housing above said drum and conforming to the curvature of the latter, and a plurality of pinch rollers depending from said rail in contact with the upper portion of said interior drum surface.

12. The apparatus of claim 8 wherein said finger means comprise a pair of resilient leaf springs normally engaging said grooves approximately tangentially to said interior drum surface, said leaf springs being curved to guide a stripped off record card in a predetermined path under its own momentum, and solenoid means selectively adapted to be energized to lift said leaf springs out of said grooves.

13. Data processing apparatus for use with unit records in the form of flexible cards, comprising a rotatable drum having a substantially cylindrical interior surface, means for constantly rotating said drum about its own axis, a plurality of cartridges each adapted to hold a number of said cards, means for selecting cards at random from said cartridges, means for accelerating each selected card edgewise toward said rotating interior drum surface to cause it to adhere thereto, transducer means adapted to be stationed in close proximity to said rotating interior drum surface, means for transferring data between said tranducer means and said card adhering to said rotating surface, and means for removing each adhering card from said rotating interior drum surface and returning it to a selected one of said cartridges.

14. Data processing apparatus for use with unit records in the form of flexible cards having a magnetizable surface, comprising at least a pair of rotatable drums having parallel axes, said drums being superpositioned to overlap at least in a limited portion of their peripheries, each of said drums being hollow and having a substantially cylindrical interior surface, means for constantly rotating each drum about its axis, means associated with each of said drums for holding a plurality of said card, means for selecting cards from said holding means, means for accelerating each selected card edgewise toward the rotating interior surface of the associated drum to cause it to adhere thereto, a magnetic head, means for positioning said head in close proximity to the rotating interior surface of a selected one of said drums, said last-recited means including means for moving said head in an axial direction, means for transferring data between said head and a card adhering to said selected rotating interior drum surface, and means for selectively removing an adhering card from each rotating interior drum surface and returning it to the associated holding means.

15. The apparatus of claim 14 wherein said head positioning means further include means for rotating said head about an axis parallel to said drum axis.

References Cited

UNITED STATES PATENTS

| | | | |
|---|---|---|---|
| 3,406,382 | 10/1968 | Wilmer | 129—16.1 |
| 3,307,555 | 3/1967 | Theis et al. | 129—16.1 |
| 3,343,149 | 9/1967 | Bleiman | 340—174.1 |
| 3,302,829 | 2/1967 | Wilmer | 340—174.1 |

OTHER REFERENCES

High Speed Tape Strip Reader by E. J. Wroblewski, IBM Tech Disclosure Bulletin, vol. 3, No. 12, May 1961.

BERNARD KONICK, Primary Examiner

V. P. CANNEY, Assistant Examiner

U.S. Cl. X.R.

129—16.1